No. 862,388. PATENTED AUG. 6, 1907.
M. CAMPBELL.
WEANING DEVICE.
APPLICATION FILED APR. 21, 1906.

Witnesses:
F. S. Baker.
H. O. L. Ollermann.

Inventor:
Mathias Campbell.
By Lon. Vaughan.
his Attorney.

UNITED STATES PATENT OFFICE.

MATHIAS CAMPBELL, OF BLAIR, NEBRASKA.

WEANING DEVICE.

No. 862,388.　　　　Specification of Letters Patent.　　　Patented Aug. 6, 1907.

Application filed April 21, 1906. Serial No. 313,067.

*To all whom it may concern:*

Be it known that I, MATHIAS CAMPBELL, a citizen of the United States of America, residing at Blair, in the county of Washington and State of Nebraska, have invented a new and useful Weaning Device, of which the following is a specification.

My invention relates to improvements in weaning contrivances to be attached to the noses of cows, steers and calves to wean the calves, prevent the cows from sucking themselves and the steers from sucking the cows; and the objects of my invention are, first to provide an adjustable attachment so that the same may be applied to either cows, steers or calves; second, to construct blank for the opposite halves of the attachment or main structure substantially alike in form so that the opposite blank halves before being perforated, threaded, and pivoted together will be interchangeable and may be cast from the same pattern; and third to provide a weaning contrivance equally adaptable and efficient for weaning calves, to prevent cows from sucking themselves or to prevent steers from sucking the cows. I attain these objects by the mechanism illustrated in the accompanying drawing in which—

Figure 1:
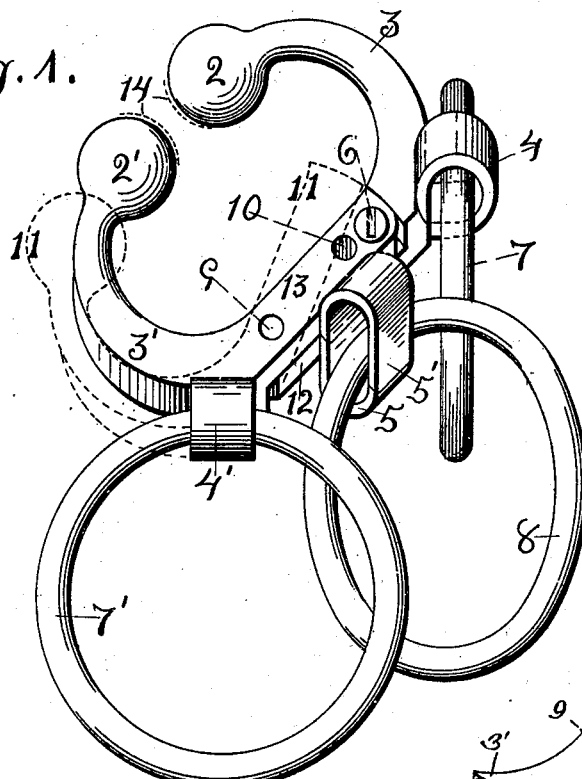
Figure 3:
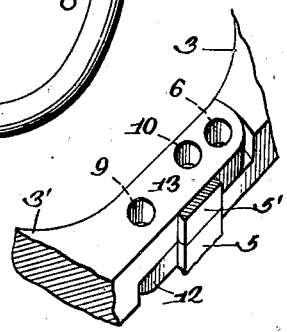
Figure 2:
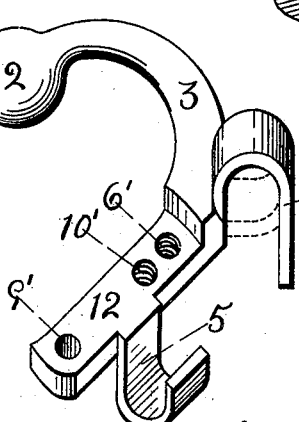

Figure 1 is a perspective view of the whole device assembled and fastened; Fig. 2, is a perspective view of one of the halves of the attachment part or main body of the contrivance, separated from the other parts; Fig. 3, is a perspective view of the overlaps 12 and 13 in their assembled position, showing the position of the aperture 10 exaggeratedly nearer to the side of the overlap 13 toward the curved arms 3 and 3′; and Fig. 4, is a perspective view of the overlap 12 showing the corresponding aperture 10′ exaggeratedly nearer to the opposite side.

Similar numerals refer to similar parts throughout the several views.

The oppositely disposed arms 3 and 3′ have their base portions reduced in thickness to form the corresponding overlaps 13 and 12, which are pivoted together near one end of said overlaps at 9. The arms 3 and 3′ are curved toward each other and terminate in the knobs 2 and 2′, thus forming the ordinary bull-ring attachment, secured by closing said knobs back of the thick front of the cartilage separating the animal's nostrils. It is fastened in this closed position by the screw-bolt 6 passed through the swinging end of the overlap 13 and its point threaded in the base of the overlap 12 at 6′.

Figure 4:
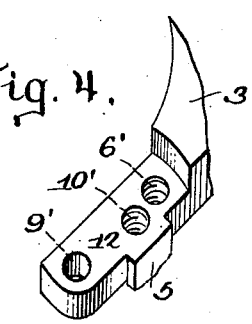

As set in Fig. 1, the knobs are in the position required for a fullgrown animal; but for calves the screw-bolt is shifted to the apertures 10 and 10′ which are slightly varied in position by perforating the overlap 13 so that the aperture 10 will be nearest to the edge toward the terminal knobs 2 and 2′, as shown in Figs. 1 and 3, and the threaded perforation 10′ nearest to the opposite edge of the overlap 12, away from said terminals, as shown in Figs. 2 and 4. The overlaps are swung on their pivot 9 until the required perforations register so as to bring the knobs closer together as indicated by the broken lines 14. When the screw-bolt 6 is removed the knob 2′, curved arm 3′ and overlap 13, swing on the pivot 9 to the position indicated by the broken lines 11, to open the device for insertion in the animal's nose. The corresponding blank halves of this nose-attaching part one of which separated halves, as perforated and threaded ready for assembling, is illustrated by Fig. 2, are exactly alike in form being cast from the same pattern or forged in the same die. One of the halves is reversed in position when a pair are assembled as shown in Fig. 1. They are made of ductile metal: brass, bronze, malleable castings, cast-steel or may be drop forged, so that the eyes 4 and 4′ which are first formed open, as shown at 4 in Fig. 2, may be cold-shut through the rings 7 and 7′ as shown in Fig. 1 and indicated by the broken lines in Fig. 2.

In constructing, the perforations 9 and 6 may be first rough-cast in the part and then finished,—half of those at the base of the overlap being threaded, as 6′, for the fastening screw 6. But the perforations 10 and 10′ are drilled through after the halves of the nose-attaching ring are pivoted together; the terminal knobs 2 and 2′ being first brought to the positions indicated by the broken lines 14 in Fig. 1 and held there while the overlaps are both drilled at one operation; then the screw-bolt 6 is fitted and seated to retain the terminal knobs at this adjustment.

At the base of the curved arm 3 near its junction with the overlap 12 the partly curved projection to be farther bent to form the integral cold-shut eye 4 is cast on the part to carry the ring 7. These parts when reversed in position, to become an opposite half of an assembled pair as shown in Fig. 1, would be: curved arm 3′, overlap 13, cold-shut eye 4′ and ring 7′. When the rings 7 and 7′ are inserted and the eyes 4 and 4′ closed around as shown in Fig. 1 and indicated by the broken lines in Fig. 2, the rings are supported at opposite sides or corners of the animals mouth and the front edges of the rings are slightly inclined toward each other at an angle varying from 10° to 45° from a direct line forward and backward. These rings 7, 7′ and 8, are about the size shown at 7′ in Fig. 1 and are common metal rings welded of iron or steel rod. For a cow the two side rings 7 and 7′ are usually ample and all that are generally needed, except for steers and calves.

When a cow attempts to suck herself, the side of her mouth on the side she bends toward, is thrown upward, which if she bent toward her left would bring the device into the position shown in Fig. 1, with the ring 7 hanging vertically against that corner of her mouth. If she thrusts her tongue through the ring she can not seize the teat and the ring can not be thrust forward or backward sufficiently to allow her to do so,—the edgewise movement of the ring being limited in the supporting eye 4.

For steers and calves an additional ring 8 is added squarely in front. The vertically elongated loop 5 to support this front ring 8 is formed of upper and lower halves, the lower half 5 being an integral projection from the front edge of the overlap 12 and the upper half 5' is a like projection from the overlap 13. The line of separation of the halves of the loop is in the same plane as the contact faces of the overlaps and the loop is sufficiently elongated to allow the inserted ring 8 to drop below the line of separation, therefore, no obstruction is offered by the ring in opening the attaching part. The loop 5 is vertically elongated for the further and more important purpose of forming a vertically elongated eye-hole allowing the ring 8. to slide up and down therein when its lower edge comes in contact with the ground or the bottoms of feed or water receptacles; thus taking up the movement of the animal's nose in feeding or drinking and thereby avoiding the wear of the knobs which sometimes produce soreness in the nostrils. Being quite near the pivot 9, the slight variation in relative positions of the halves of the loop, caused by adjusting the distance between the knobs, produces no inconvenience.

By the three common rings attached and disposed on the adjustable attaching arms, as set forth above, I have a very efficient and harmless weaning device, economical of construction.

I claim:

1. An adjustable weaning device having in combination a pair of oppositely disposed curved arms with terminal knobs, a connecting base consisting of an integral overlap from the base of each arm, said overlaps pivoted together and opposite overlaps perforated equidistant from the pivot, said perforations being out of radial alinement in opposite overlaps to receive a fastening-screw whereby the relative positions of the overlaps are varied and the terminal knobs retained at different distances apart, an integral projection bent to form an eye on the base of each arm, a ring disposed through each eye, a half-loop on each overlap to form a centrally disposed loop, and a ring disposed through said loop.

2. An adjustable weaning device having in combination a pair of arms curved toward each other and having terminal knobs, an integral projection bent to form an eye on the base of each arm and a ring disposed through each eye, an overlap projecting from the base of each arm and said overlaps pivoted together to form a jointed base, opposite overlaps perforated the same radial distances from the pivot but out of radial alinement in opposite overlaps to receive a fastening-screw to retain the terminal knobs at different distances apart.

3. A weaning device consisting of a pair of opposed curved arms having terminal knobs, overlaps pivoted together to form a jointed connecting base between said arms, a projection bent to form an eye at the base of each arm to suspend rings at the ends of said connecting base, and projections on said overlaps to form an eye at the center of said connecting base to suspend a ring between said end rings.

4. A weaning device consisting of a pair of nose-engaging arms having terminal knobs and connected by a horizontal base and a ring suspended at each end of said base.

5. A weaning device consisting of a nose-ring having a horizontal base, a ring suspended at each end of said base, and a ring suspended at the center of said base.

6. A blank adapted to be fitted up for either half of a nose-attaching weaning device, consisting of a curved arm having a terminal knob, a projection adapted to be bent to form a cold-shut eye at the base of said arm, a connecting overlap projecting from said base, and a half-loop on said overlap.

7. A blank adapted to be fitted up for either half of a nose-attaching weaning device consisting of, a curved arm having a terminal knob, an integral connecting-overlap projecting from the base of said arm, and an integral projecting bar adapted to be bent to form an eye on said base.

8. An adjustable nose-attachment for an animal weaning device, consisting of a pair of oppositely disposed curved arms having terminal knobs, the bases of said arms lapped and pivoted together, opposite lapped portions of said bases perforated at equal distances from the pivot but on different radial lines in opposite overlaps and threaded to receive a fastening-screw to retain said terminal knobs at different distances apart.

MATHIAS CAMPBELL.

Witnesses:
F. S. BAKER,
JOHN LOTHROP.